US012619755B2

(12) United States Patent
Han et al.

(10) Patent No.: US 12,619,755 B2
(45) Date of Patent: May 5, 2026

(54) ARTIFICIAL DATA GENERATION FOR DIFFERENTIAL PRIVACY

(71) Applicant: International Business Machines Corporation, Armonk, NY (US)

(72) Inventors: Si Er Han, Xi'an (CN); Jing Xu, Xi'an (CN); Xiao Ming Ma, Xi'an (CN); Jing James Xu, Xi'an (CN); Jiang Bo Kang, Xi'an (CN); Xue Ying Zhang, Xi'an (CN); Jun Wang, Xi'an (CN); Ji Hui Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 18/490,914

(22) Filed: Oct. 20, 2023

(65) Prior Publication Data

US 2025/0131116 A1    Apr. 24, 2025

(51) Int. Cl.
*G06F 21/62*        (2013.01)
*G06F 21/60*        (2013.01)

(52) U.S. Cl.
CPC .......... *G06F 21/6218* (2013.01); *G06F 21/60* (2013.01); *G06F 21/6254* (2013.01); *G06F 2221/2113* (2013.01)

(58) Field of Classification Search
CPC ...... G06F 21/60; G06F 21/62; G06F 21/6218; G06F 21/6245; G06F 21/6254; G06F 2221/21; G06F 2221/2113
See application file for complete search history.

(56) References Cited

U.S. PATENT DOCUMENTS

| | | | |
|---|---|---|---|
| 7,698,250 B2 | 4/2010 | Dwork et al. | |
| 11,886,617 B1* | 1/2024 | Du | G06F 21/6254 |
| 2020/0327252 A1* | 10/2020 | Mcfall | G06F 21/78 |
| 2021/0012028 A1 | 1/2021 | Cabot et al. | |
| 2021/0226956 A1* | 7/2021 | Wei | H04L 63/108 |

(Continued)

FOREIGN PATENT DOCUMENTS

| | | |
|---|---|---|
| CN | 108197492 B | 6/2021 |
| CN | 114969804 A | 8/2022 |

(Continued)

OTHER PUBLICATIONS

Couch et al. "Differentially Private Nonparametric Hypothesis Testing", arXiv:1903.09364, Mar. 22, 2019, 39 pages.

(Continued)

*Primary Examiner* — D'Arcy Winston Straub
(74) *Attorney, Agent, or Firm* — Garg Law Firm, PLLC; Rakesh Garg; Steven Bouknight

(57) ABSTRACT

An embodiment configures a plurality of parameters, the parameters being usable to generate artificial data from original data, the configuring adjusting a level of privacy in the artificial data. An embodiment fits a distribution type to a variable of the original data. An embodiment adjusts, using a desired level of privacy and the distribution type, a level of noise, wherein the level of noise corresponds to the desired level of privacy. An embodiment generates, using the distribution type and the level of noise, the artificial data, the artificial data achieving the desired level of privacy by including noise data corresponding to the level of noise.

25 Claims, 8 Drawing Sheets

(56) References Cited

U.S. PATENT DOCUMENTS

| | | | |
|---|---|---|---|
| 2021/0312064 A1* | 10/2021 | Arthur | ................... G06N 3/094 |
| 2022/0277097 A1 | 9/2022 | Cabot et al. | |
| 2023/0130637 A1 | 4/2023 | Hosudurg et al. | |

FOREIGN PATENT DOCUMENTS

| | | | |
|---|---|---|---|
| CN | 110651449 B | 10/2022 | |
| CN | 115956244 A | 4/2023 | |
| CN | 116340992 A | 6/2023 | |
| CN | 110598447 B | 7/2023 | |
| CN | 109716345 B | 9/2023 | |
| KR | 102054450 B1 | 12/2019 | |
| WO | 2022061162 A1 | 3/2022 | |
| WO | 2025/082913 A1 | 4/2025 | |

OTHER PUBLICATIONS

International Searching Authority, "Notification of Transmittal of the International Search Report and the Written Opinion of the International Searching Authority, or Declaration," Patent Cooperation Treaty, Nov. 12, 2024, 13 pages, International Application No. PCT/EP2024/078893.

Lee et al., How Much Is Enough? Choosing $\epsilon$ for Differential Privacy, ISC 2011, LNCS 7001, pp. 325-340, 2011.

Naldi et al., Differential Privacy: An Estimation Theory-Based Method for Choosing Epsilon, Oct. 4, 2015.

IBM, Setting Options for the Simulation Generate Node, Feb. 3, 2023, https://www.ibm.com/docs/en/spss-modeler/18.4.0?topic=node-setting-options-simulation-generate.

Hsu et al., Differential Privacy: An Economic Method for Choosing Epsilon, Feb. 17, 2014.

Krehbiel, Choosing Epsilon for Privacy as a Service, Privacy Enhancing Technologies, 2019.

Taiwan Patent Office, "First Office Action" Jun. 23, 2025, 27 Pages, TW Application No. 113137218.

Taiwan Patent Office, "Office Action," Feb. 2, 2026, 14 Pages, TW Application No. 113137218.

* cited by examiner

Figure 3:
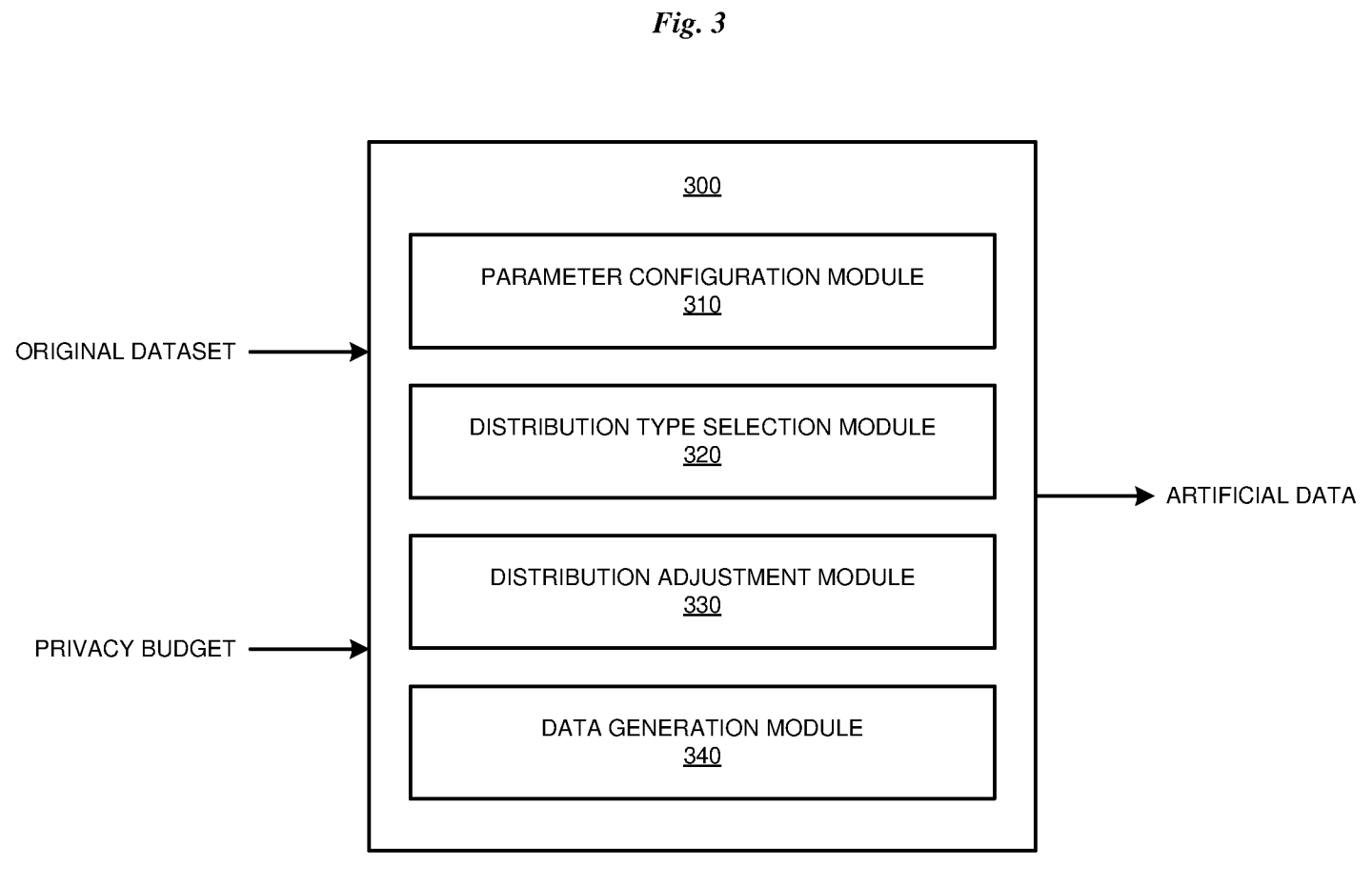

PARAMETER CONFIGURATION MODULE
310

DISTRIBUTION TYPE SELECTION MODULE
320

DISTRIBUTION ADJUSTMENT MODULE
330

DATA GENERATION MODULE
340

ORIGINAL DATASET

PRIVACY BUDGET

ARTIFICIAL DATA

GRAPH  400

DEGREE OF PROTECTION = $e^{-\varepsilon}$

DEGREE OF PROTECTION = PROBABILITY OF AMOUNT OF NOISE THAT IS LARGER THAN THE LOCAL SENSITIVITY

STRONG PROTECTION

MODERATE PROTECTION

WEAK PROTECTION

EPSILON

ARTIFICIAL DATA GENERATION FOR DIFFERENTIAL PRIVACY

BACKGROUND

The present invention relates generally to data privacy. More particularly, the present invention relates to a method, system, and computer program for artificial data generation for differential privacy.

A dataset or database is a logical container used to organize and control access to resources such as stored data. A dataset typically includes one or more tables. A table stores data values using a model of labelled columns (also referred to as variables or fields) and rows (also referred to as records). A cell of the table is an intersection of a row and a column. Typically, column labels designate a particular type of data (for example, a table might have columns labelled "Customer ID", "Name", "Address", and "Telephone Number"), and rows hold data for particular individuals (e.g., data for Customer A might be stored in row 1 and data for Customer B might be stored in row 2).

Data simulation, or artificial data generation, is a process of generating artificial data that mimics the characteristics and patterns of real-world data. Data simulation is often used to generate training and testing data for use in developing machine learning models and in other situations where insufficient real-world data is available for use. Data simulation is typically performed by fitting a parametric statistical distribution to the observed data, and generating new data points from the fitted distribution. However, statistical analyses of data in a dataset can reveal information about a single individual in the dataset, particularly if an adversary knows information about other individuals in the dataset. Thus, privacy preserving data analysis and data simulation techniques, which attempt to make a dataset usable for analysis or generate artificial data using statistical information about a dataset, without compromising the privacy of any individuals with records in the dataset, have been developed.

One method of implementing privacy preserving data analysis is differential privacy, which hides the presence of an individual in a dataset from a user of the dataset by making two output distributions, one with and the other without the individual, be computationally indistinguishable (for all individuals). To achieve this, differential privacy adds random noise to an output. In data simulation, the noise is added to one or more parameters of the fitted distribution. The amount of noise added to a parameter of a fitted distribution is influenced by a privacy budget parameter named epsilon ($\varepsilon$). A smaller value of epsilon corresponds to stronger privacy preservation. However, reducing epsilon also results in decreased accuracy.

The illustrative embodiments recognize that selecting an appropriate value for epsilon requires knowledge of the dataset being protected, but it is difficult for an inexperienced data analyst to relate a value of epsilon to a particular protection need. In addition, statistical characteristics of the dataset, such as outliers in the data, are both easier for an adversary to obtain by applying statistical analysis techniques to the dataset and alter the value of epsilon need to protect privacy. In addition, particularly for a dataset with multiple variables, it is important to determine that the quality of simulated data is sufficient for a user's needs. Thus, the illustrative embodiments recognize that there is a need to generate parameters for artificial data generation for differential privacy, as well as measure the quality of the resulting data, in an automated and dataset-dependent manner.

SUMMARY

The illustrative embodiments provide for artificial data generation for differential privacy. An embodiment includes configuring a plurality of parameters, the parameters being usable to generate artificial data from original data, the configuring adjusting a level of privacy in the artificial data. An embodiment includes fitting a distribution type to a variable of the original data. An embodiment includes adjusting, using a desired level of privacy and the distribution type, a level of noise, wherein the level of noise corresponds to the desired level of privacy. An embodiment includes generating, using the distribution type and the level of noise, the artificial data, the artificial data achieving the desired level of privacy by including noise data corresponding to the level of noise. Other embodiments of this aspect include corresponding computer systems, apparatus, and computer programs recorded on one or more computer storage devices, each configured to perform the actions of the embodiment. Thus, an embodiment provides artificial data generation for differential privacy.

In a further embodiment, configuring the plurality of parameters comprises setting an upper bound parameter of a continuous variable comprising the original data to a first value according to a statistical characteristic of the continuous variable. Thus, an embodiment provides additional detail of a parameter used in artificial data generation for differential privacy.

In a further embodiment, configuring the plurality of parameters comprises setting a lower bound parameter of a continuous variable comprising the original data to a second value according to a statistical characteristic of the continuous variable. Thus, an embodiment provides additional detail of a parameter used in artificial data generation for differential privacy.

In a further embodiment, the variable contributes to a privacy aspect of the original data. Thus, an embodiment provides additional detail of a variable used in artificial data generation for differential privacy.

In a further embodiment, fitting a distribution type to the variable of the original data further comprises selecting, from a plurality of distribution type fittings according to a goodness of fit statistic computed on each distribution type fitting, the distribution type. Thus, an embodiment provides additional detail of artificial data generation for differential privacy.

In a further embodiment, the desired level of privacy is higher than a level of privacy in the original data. Thus, an embodiment provides additional detail of a desired level of privacy used in artificial data generation for differential privacy.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

An embodiment includes a data processing system. The computer system includes a processor, a computer-readable memory, and a computer-readable storage medium, and program instructions stored on the storage medium for execution by the processor via the memory.

An embodiment includes a cloud infrastructure. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 3 depicts a block diagram of an example configuration for artificial data generation for differential privacy in accordance with an illustrative embodiment;

DETAILED DESCRIPTION

Figure 1:
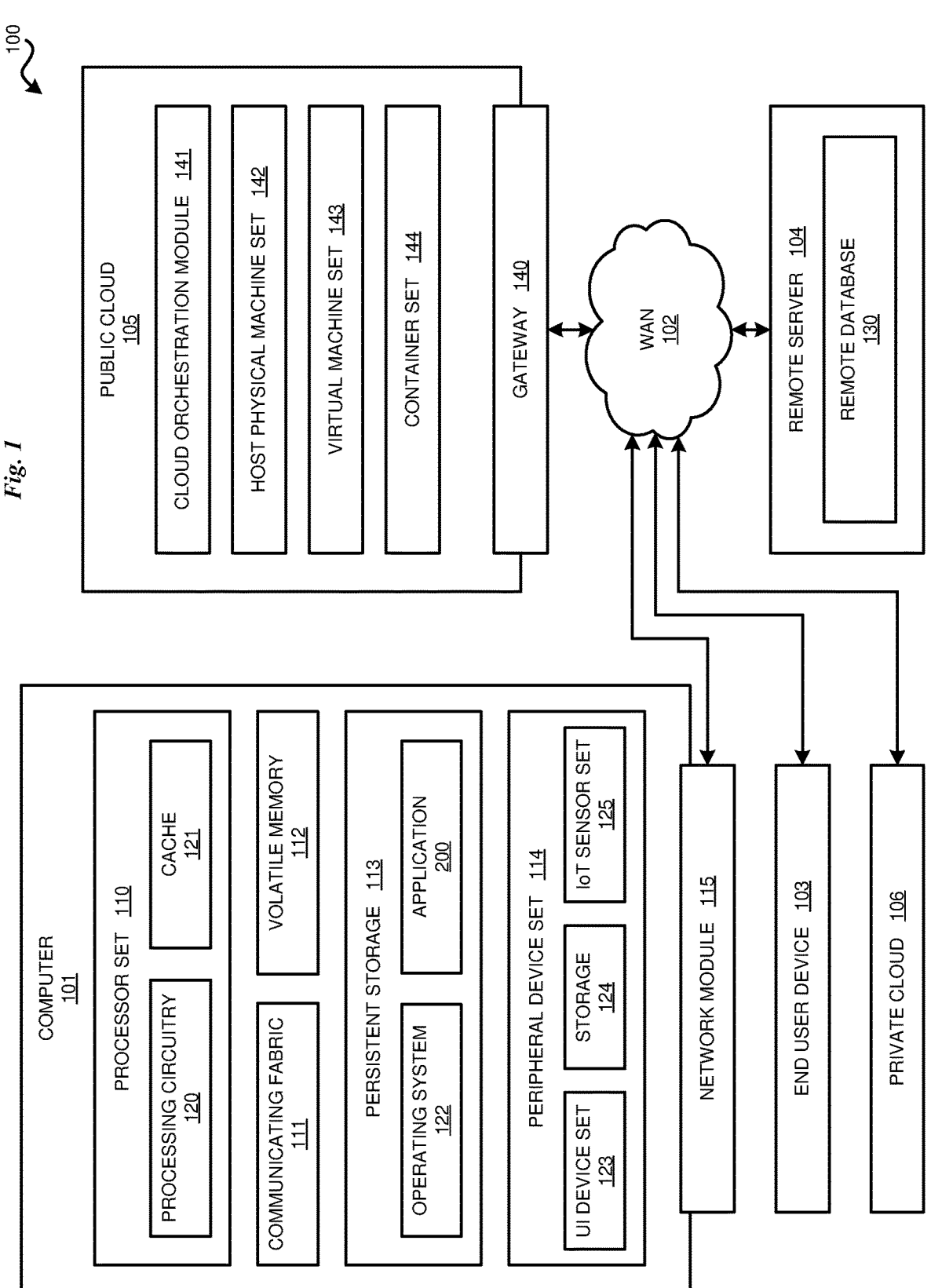
FIG. 1 depicts a block diagram of a computing environment in accordance with an illustrative embodiment.

The illustrative embodiments recognize that there is a need to generate parameters for artificial data generation for differential privacy, as well as measure the quality of the resulting data, in an automated and dataset-dependent manner. The present disclosure addresses the deficiencies described above by providing a process (as well as a system, method, machine-readable medium, etc.) that configures a plurality of parameters, the parameters being usable to generate artificial data from original data, the configuring adjusting a level of privacy in the artificial data, fits a distribution type to a variable of the original data, adjusts a level of noise using a desired level of privacy and the distribution type, and generates, using the distribution type and the level of noise, the artificial data, the artificial data achieving the desired level of privacy by including noise data corresponding to the level of noise. Thus, the illustrative embodiments provide for artificial data generation for differential privacy.

An illustrative embodiment receives an original dataset from which artificial data is to be generated using differential privacy. An embodiment also receives a value of a privacy budget parameter named epsilon (denoted by $\varepsilon$), which influences the amount of noise added to a parameter of a fitted distribution when generating artificial data. Another embodiment uses a default value of epsilon. Another embodiment uses a set of rules or another presently available technique to set epsilon to a particular value depending on the type of data present in a dataset, the cost to use a dataset, or another factor influencing a level of protection desired for the dataset. For example, a dataset holding hospital patients' health data might require a higher level of protection than a dataset holding statistics for already-played sports games. In addition, one embodiment uses the same value of epsilon for every variable (column) in a dataset, while another embodiment implements a variable-specific value of epsilon. Implementing a variable-specific value of epsilon allows for applying a higher level of protection to one variable (e.g., a customer's tax identification number) and a lower level of protection to another variable (e.g., the sports equipment a customer has recently bought).

An embodiment explains the meaning of a particular epsilon to a user, in terms of a degree of protection parameter, also referred to herein as a level of privacy parameter. In particular, the degree of privacy protection for a variable for which artificial data is being generated is the probability of an amount of noise that is larger than the local sensitivity of the variable, and is equal to $e^{-\varepsilon}$. Local sensitivity is the largest difference between two analysis results of two datasets which are the same except for one record. For example, one dataset might include data for January, while the other dataset might include data for February instead of January. Techniques are presently available to compute local sensitivity for a particular dataset.

Because there are likely to be fewer outlier values of a continuous variable in a dataset than values nearer the mean of the continuous variable, outlier values are easier for an adversary to obtain by applying statistical analysis techniques to the dataset. For example, a result of querying a dataset of patient ages for a person who is older than 110 might include only one record, thus revealing that record. Thus, an embodiment configures an upper bound parameter, a lower bound parameter, or both upper and lower bound parameters for a continuous variable for which artificial data is being generated. One embodiment receives upper and lower bound parameters from a user. Another embodiment sets an upper bound parameter, a lower bound parameter, or both upper and lower bound parameters according to a statistical characteristic of the continuous variable. One embodiment sets the lower bound parameter to m−N*std and the upper bound parameter to m+N*std, where m and std denote the mean and standard deviation of the variable and N is a configurable constant parameter. Other techniques for setting upper and lower bound parameters are also possible and contemplated within the scope of the illustrative embodiments.

Thus, an embodiment configures a plurality of parameters, the parameters being usable to generate artificial data from original data, the configuring adjusting a level of privacy in the artificial data. The parameters include at least epsilon and the upper and lower bound parameters described herein. Optionally, the parameters include other parameters presently known to control a differential privacy implementation, such as the presently known delta parameter.

An embodiment fits a distribution type to a variable of the original data. In one embodiment, the variable contributes to a privacy aspect of the original data. For example, the variable might be personally identifiable data (e.g., a tax identification number), financial data (e.g., a yearly income), or protected health data. Another embodiment fits a distribution type to every variable of the original data, or a subset of variables of the original data.

An embodiment has access to one or more presently available distribution types applicable to a continuous variable (e.g., uniform, normal, triangular, lognormal, exponential, beta, gamma, and Weibull distribution types) and one or more presently available distribution types applicable to a discrete variable (e.g., Bernoulli, Poisson, binomial, categorical, and negative binomial distribution types). One embodiment selects a distribution type according to a set of rules based on a characteristic of a particular variable. For example, an embodiment might select one distribution type for every continuous variable, and another distribution type for every discrete variable.

Another embodiment uses a presently available technique to fit one or more distribution types applicable to a variable to the data of that variable, and uses a presently available technique to compute a goodness of fit statistic on the result of the fitting. One non-limiting example of a goodness of fit statistic is the Kolmogorov-Smirnov test. Other goodness of fit statistics are also possible and contemplated within the scope of the illustrative embodiments. An embodiment selects, as the distribution type for a particular variable, the distribution type with the smallest (i.e., best) goodness of fit statistic.

If an embodiment has configured an upper bound parameter, a lower bound parameter, or both upper and lower bound parameters for a continuous variable for which artificial data is being generated. applicable, an embodiment applies the configured parameters to the original data. In particular, if, in a record in the original dataset, a value of the continuous variable is less than a lower bound parameter, an embodiment adjusts the value to be the lower bound parameter. Similarly, if, in a record in the original dataset, a value of the continuous variable is greater than an upper bound parameter, an embodiment adjusts the value to be the upper bound parameter. An embodiment stores the adjusted version of the original dataset as an adjusted dataset.

An embodiment fits a selected distribution type to data of a variable in the adjusted dataset (if an adjusted dataset was generated) or in the original dataset (if no adjustment was made for the variable). The fitting configures values of one or more parameters of the selected distribution type. For example, a normal distribution has a mean parameter and a variance parameter.

Using the level of privacy and the distribution type, an embodiment adjusts a level of noise to be added to a configured parameter of the selected distribution type. The level of noise corresponds to a desired level of privacy. In one embodiment, the level of noise is a value (denoted by z) selected from the Laplace distribution, $f(z)=\exp(|z|/s)/2s$, where s is equal to a local sensitivity of the variable divided by the epsilon parameter and exp( ) denotes e raised to the power of the contents of the parentheses.

An embodiment adds noise data corresponding to the adjusted level of noise to a configured parameter of the selected distribution type, resulting in a differential privacy parameter of the selected distribution type. An embodiment uses the selected distribution type, configured according to one or more differential privacy parameters, to generate artificial data that achieves the desired level of privacy. In embodiments, the desired level of privacy is higher than a level of privacy in the original data. Techniques are presently available to generate artificial data according to a distribution type configured with one or more parameters.

An embodiment uses one or more presently available statistical measurement techniques to measure a quality level of the artificial data. An embodiment computes a similarity between original values of a variable in the dataset and generated values for the same variable. One presently available technique for computing similarity is the Kolmogov-Smirnov test, using a p-value output of the test as the similarity. An embodiment computes an overall similarity between the original values (for all variables, or a subset of the variables) in the dataset and generated values for the same variables, by averaging together similarities for individual variables.

An embodiment provides individual and overall similarities to a user, optionally ranked by the similarities of each variable. If the similarity for a variable or the overall similarity is below a threshold value, an embodiment selects a different value for one or more of the parameters described herein (e.g., epsilon), or prompts a user to select a different value for one or more of the parameters described herein, and regenerates artificial data with the different value.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as block 200 implementing artificial data generation for differential privacy. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
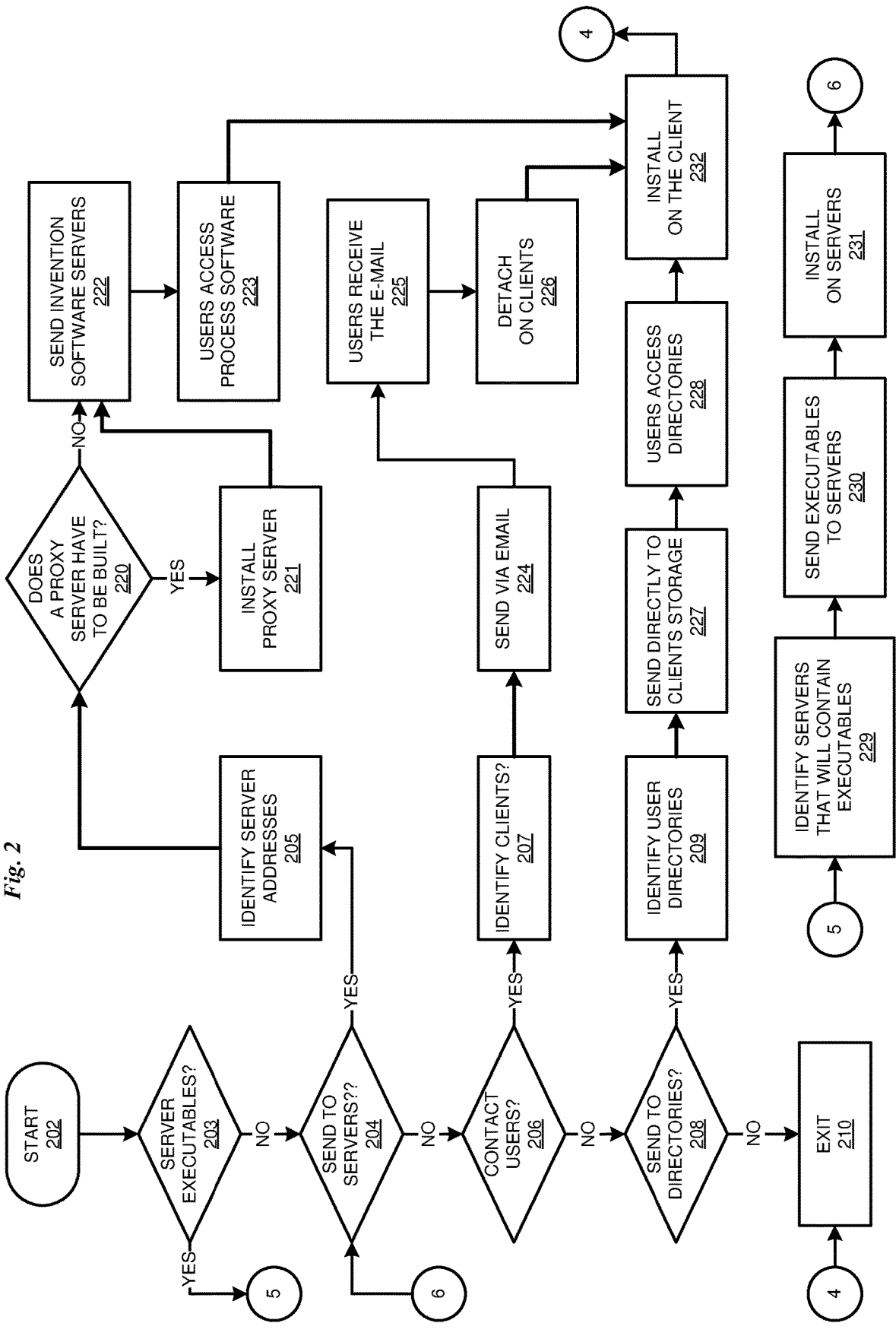
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing artificial data generation for differential privacy may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

With reference to FIG. 3, this figure depicts a block diagram of an example configuration for artificial data generation for differential privacy in accordance with an illustrative embodiment. Application 300 is the same as application 200 in FIG. 1.

In the illustrated embodiment, parameter configuration module 310 receives an original dataset from which artificial data is to be generated using differential privacy. Module 310 also receives a value of a privacy budget parameter named epsilon (denoted by), which influences the amount of noise added to a parameter of a fitted distribution when generating artificial data. Another implementation of module 310 uses a default value of epsilon. Another implementation of module 310 uses a set of rules or another presently available technique to set epsilon to a particular value depending on the type of data present in a dataset, the cost to use a dataset, or another factor influencing a level of protection desired for the dataset. For example, a dataset holding hospital patients' health data might require a higher level of protection than a dataset holding statistics for already-played sports games. In addition, one implementation of module 310 uses the same value of epsilon for every variable (column) in a dataset, while another implementation uses a variable-specific value of epsilon. Implementing a variable-specific value of epsilon allows for applying a higher level of protection to one variable (e.g., a customer's tax identification number) and a lower level of protection to another variable (e.g., the sports equipment a customer has recently bought).

Module 310 explains the meaning of a particular epsilon to a user, in terms of a degree of protection parameter, also referred to herein as a level of privacy parameter. In particular, the degree of privacy protection for a variable for which artificial data is being generated is the probability of an amount of noise that is larger than the local sensitivity of the variable, and is equal to $e^{-\varepsilon}$. Techniques are presently available to compute local sensitivity for a particular dataset.

Because there are likely to be fewer outlier values of a continuous variable in a dataset than values nearer the mean of the continuous variable, outlier values are easier for an adversary to obtain by applying statistical analysis techniques to the dataset. For example, a result of querying a dataset of patient ages for a person who is older than 110 might include only one record, thus revealing that record. Thus, module 310 configures an upper bound parameter, a lower bound parameter, or both upper and lower bound parameters for a continuous variable for which artificial data is being generated. One implementation of module 310 receives upper and lower bound parameters from a user. Another implementation of module 310 sets an upper bound parameter, a lower bound parameter, or both upper and lower bound parameters according to a statistical characteristic of the continuous variable. One implementation of module 310 sets the lower bound parameter to m−N*std and the upper bound parameter to m+N*std, where m and std denote the mean and standard deviation of the variable and N is a configurable constant parameter. Other techniques for setting upper and lower bound parameters are also possible.

Thus, module 310 configures a plurality of parameters, the parameters being usable to generate artificial data from original data, the configuring adjusting a level of privacy in the artificial data. The parameters include at least epsilon and the upper and lower bound parameters described herein.

Distribution type selection module 320 fits a distribution type to a variable of the original data. In one implementation of module 320, the variable contributes to a privacy aspect of the original data. For example, the variable might be personally identifiable data (e.g., a tax identification number), financial data (e.g., a yearly income), or protected health data. Another implementation of module 320 fits a distribution type to every variable comprising the original data, or a subset of variables comprising the original data.

Module 320 has access to one or more presently available distribution types applicable to a continuous variable (e.g., uniform, normal, triangular, lognormal, exponential, beta, gamma, and Weibull distribution types) and one or more presently available distribution types applicable to a discrete variable (e.g., Bernoulli, Poisson, binomial, categorical, and negative binomial distribution types). One implementation of module 320 selects a distribution type according to a set of rules based on a characteristic of a particular variable. For example, module 320 might select one distribution type for every continuous variable, and another distribution type for every discrete variable.

Another implementation of module 320 uses a presently available technique to fit one or more distribution types applicable to a variable to the data of that variable, and uses a presently available technique to compute a goodness of fit statistic on the result of the fitting. One non-limiting example of a goodness of fit statistic is the Kolmogorov-Smirnov test. Other goodness of fit statistics are also possible. Module 320 selects, as the distribution type for a particular variable, the distribution type with the smallest (i.e., best) goodness of fit statistic.

If module 310 has configured an upper bound parameter, a lower bound parameter, or both upper and lower bound parameters for a continuous variable for which artificial data is being generated. applicable, distribution adjustment module 330 applies the configured parameters to the original data. In particular, if, in a record in the original dataset, a value of the continuous variable is less than a lower bound parameter, module 330 adjusts the value to be the lower bound parameter. Similarly, if, in a record in the original dataset, a value of the continuous variable is greater than an upper bound parameter, module 330 adjusts the value to be the upper bound parameter. Module 330 stores the adjusted version of the original dataset as an adjusted dataset.

Module 330 fits a selected distribution type to data of a variable in the adjusted dataset (if an adjusted dataset was generated) or in the original dataset (if no adjustment was made for the variable). The fitting configures values of one or more parameters of the selected distribution type. For example, a normal distribution has a mean parameter and a variance parameter.

Using a desired level of privacy and the distribution type, module 330 adjusts a level of noise to be added to a configured parameter of the selected distribution type. The level of noise corresponds to the desired level of privacy. In one implementation of module 330, the level of noise is (denoted by z) selected from the Laplace distribution, f(z)

=exp(|z|/s)/2s, where s is equal to a local sensitivity of the variable divided by the epsilon parameter and exp( ) denotes e raised to the power of the contents of the parentheses.

Module 330 adds noise data corresponding to the adjusted level of noise to a configured parameter of the selected distribution type, resulting in a differential privacy parameter of the selected distribution type. Data generation module 340 uses the selected distribution type, configured according to one or more differential privacy parameters, to generate artificial data that achieves the desired level of privacy. In implementations of module 340, the desired level of privacy is higher than a level of privacy in the original data. Techniques are presently available to generate artificial data according to a distribution type configured with one or more parameters.

Module 340 uses one or more presently available statistical measurement techniques to measure a quality level of the artificial data. Module 340 computes a similarity between original values of a variable in the dataset and generated values for the same variable. One presently available technique for computing similarity is the Kolmogov-Smirnov test, using a p-value output of the test as the similarity. Module 340 computes an overall similarity between the original values (for all variables, or a subset of the variables) in the dataset and generated values for the same variables, by averaging together similarities for individual variables.

Application 300 provides individual and overall similarities to a user, optionally ranked by the similarities of each variable. If the similarity for a variable or the overall similarity is below a threshold value, application 300 selects a different value for one or more of the parameters described herein (e.g., epsilon), or prompts a user to select a different value for one or more of the parameters described herein, and regenerates artificial data with the different value.

Figure 4:
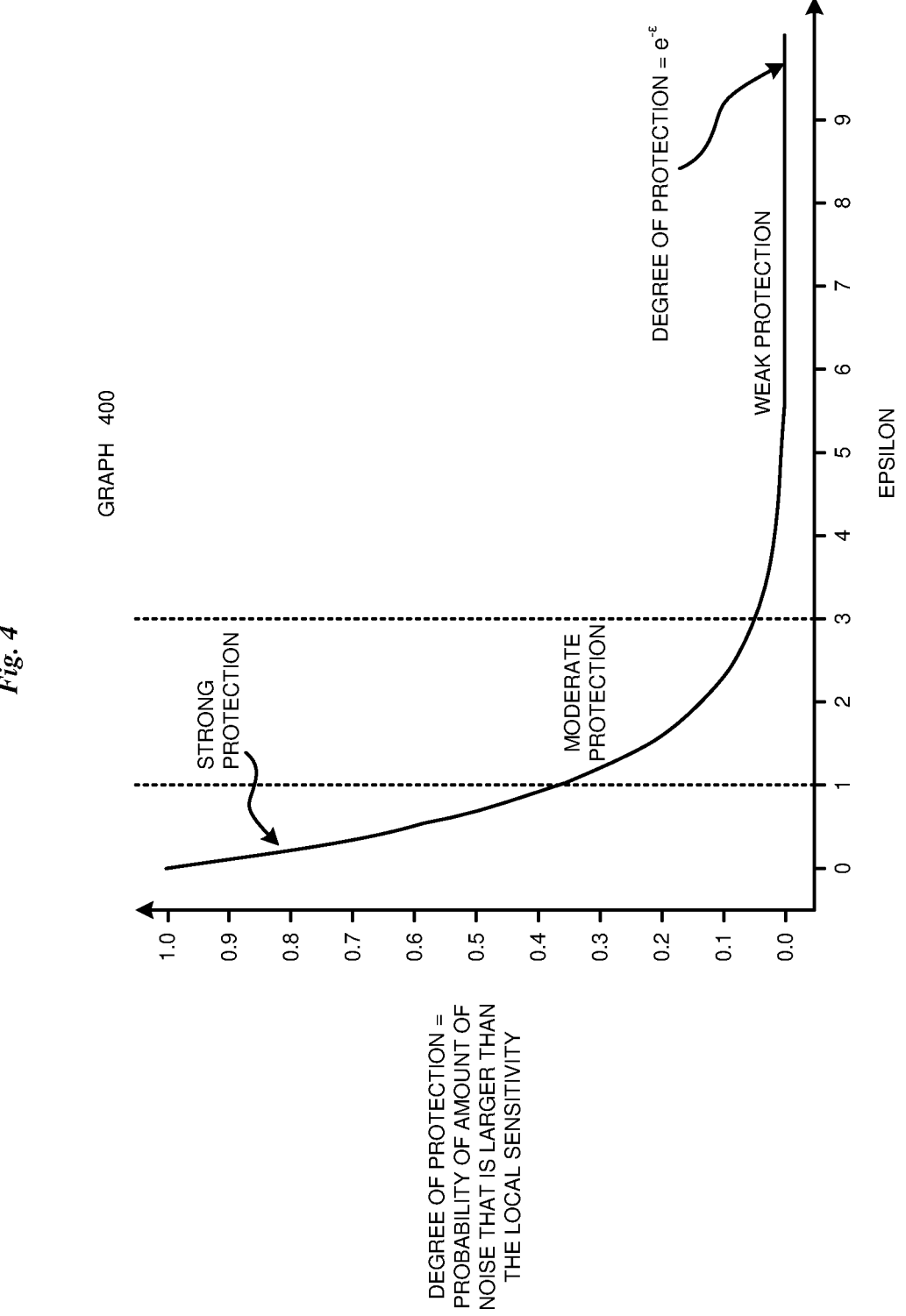
FIG. 4 depicts an example of parameter configuration for artificial data generation for differential privacy in accordance with an illustrative embodiment.

With reference to FIG. 4, this figure depicts an example of parameter configuration for artificial data generation for differential privacy in accordance with an illustrative embodiment. The example depicts parameters used in application 300 in FIG. 3.

In particular, graph 400 depicts a relationship between epsilon and a degree of protection parameter, also referred to herein as a level of privacy parameter. Graph 400 is an example of an explanation of the meaning of a particular epsilon to a user, in terms of a degree of protection parameter. In particular, the degree of privacy protection for a variable for which artificial data is being generated is the probability of an amount of noise that is larger than the local sensitivity of the variable, and is equal to $e^{-\epsilon}$. Thus, an epsilon in a particular range (e.g., between 0 and 1) results in a particular degree of protection (e.g., a degree of protection above 0.4, labelled as strong protection). Boundaries between different ranges for epsilon are user-definable, set by application 300 according to a statistical characteristic of the original dataset, or set according to default values.

Figure 5:
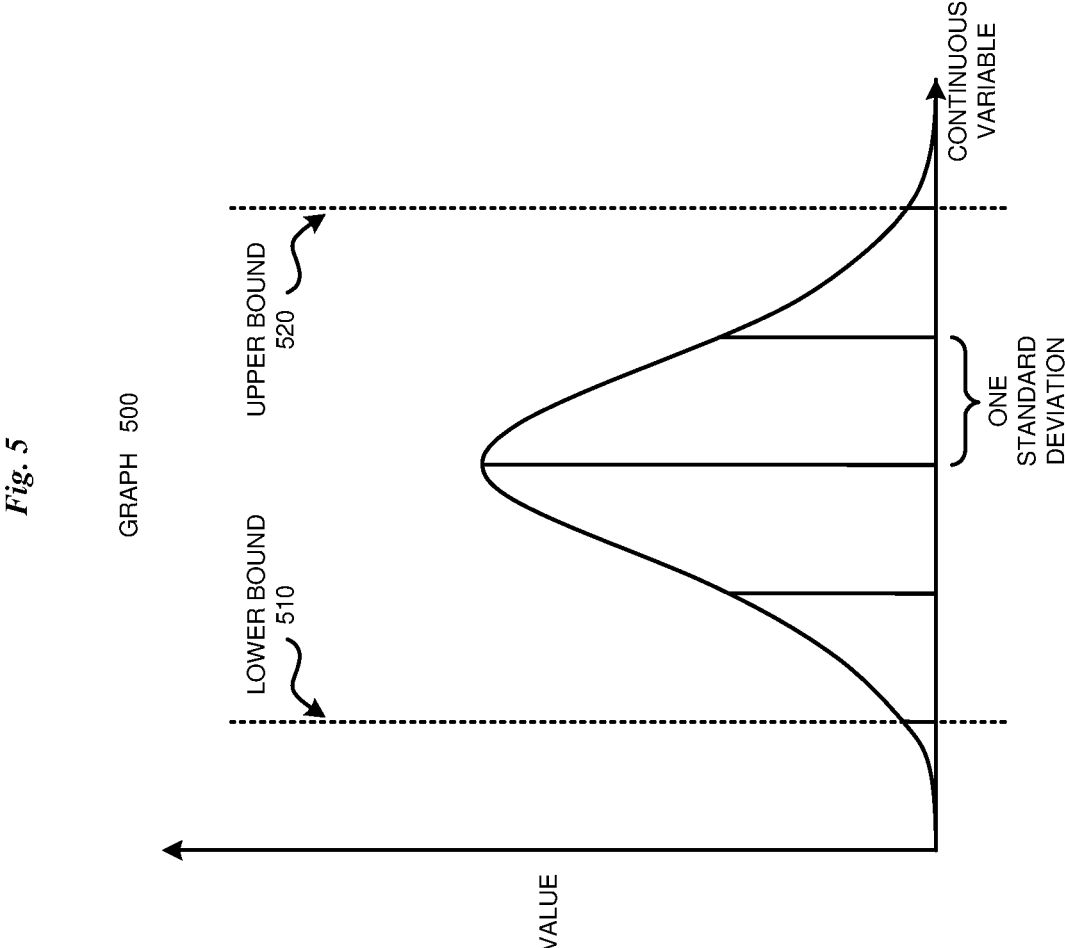
FIG. 5 depicts another example of parameter configuration for artificial data generation for differential privacy in accordance with an illustrative embodiment.

With reference to FIG. 5, this figure depicts another example of parameter configuration for artificial data generation for differential privacy in accordance with an illustrative embodiment. The example depicts parameters used in application 300 in FIG. 3.

In particular, graph 500 depicts a distribution of values of a continuous variable for which artificial data is being generated, with lower bound 510 and upper bound 520. As depicted, lower bound 510 is set to m−N*std and upper bound 520 to m+N*std, where m and std denote the mean and standard deviation of the variable and N is a configurable constant parameter. Application 300 applies the configured parameters to the original data. In particular, if, in a record in the original dataset, a value of the continuous variable is less than a lower bound parameter, application 300 adjusts the value to be lower bound 510. Similarly, if, in a record in the original dataset, a value of the continuous variable is greater than an upper bound parameter, application 300 adjusts the value to be upper bound 520. Application 300 stores the adjusted version of the original dataset as an adjusted dataset.

Figure 6:
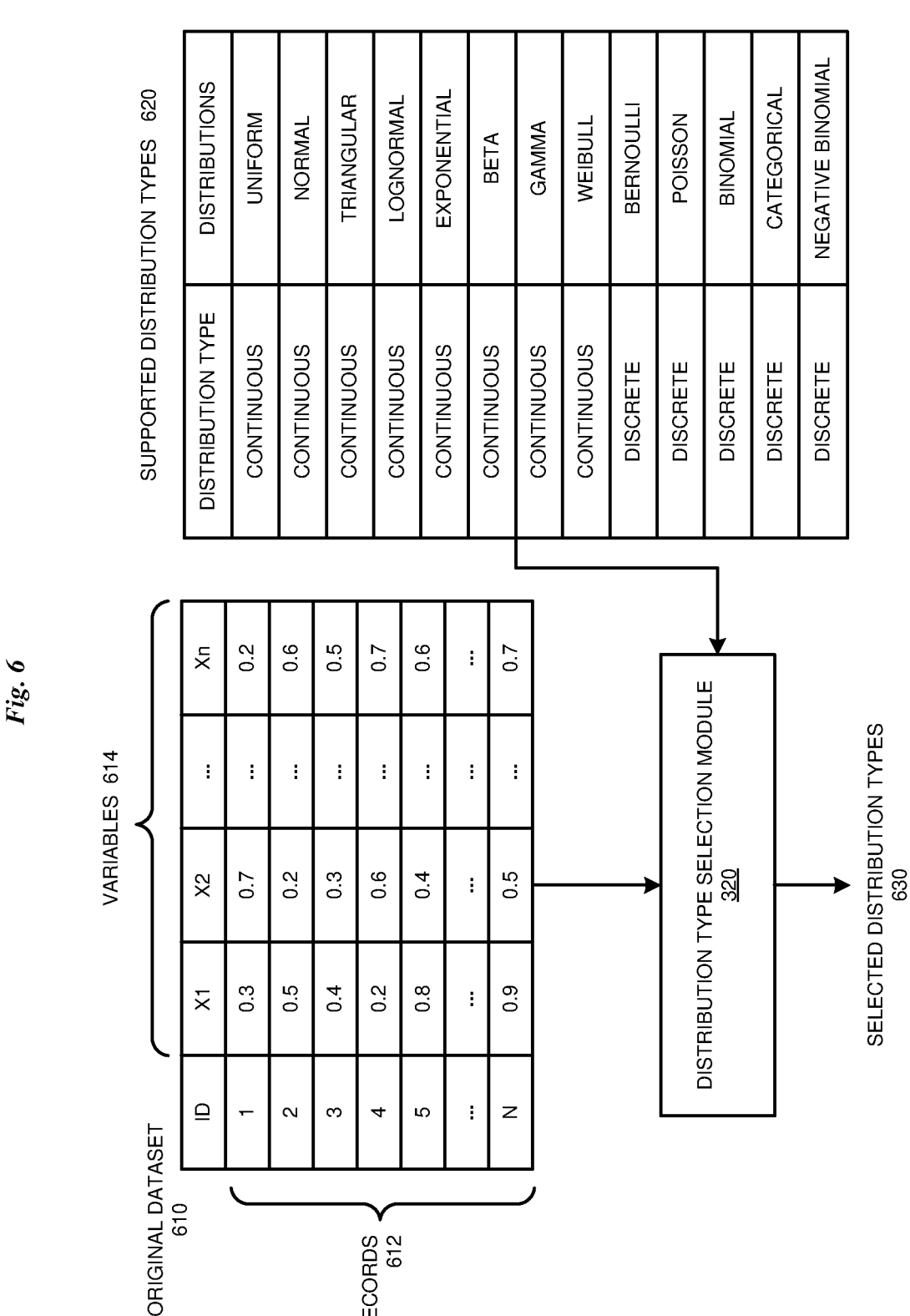
FIG. 6 depicts an example of artificial data generation for differential privacy in accordance with an illustrative embodiment.

With reference to FIG. 6, this figure depicts an example of artificial data generation for differential privacy in accordance with an illustrative embodiment. The example can be executed using application 300 in FIG. 3. Distribution type selection module 320 is the same as distribution type selection module 320 in FIG. 3.

Original dataset 610 depicts example data, arranged by rows (records 612) and columns (variables 614). Supported distribution types 620 depicts examples of presently available distribution types to which module 320 has access to. Some distribution types apply to a continuous variable, and other distribution types apply to a discrete variable. The results are depicted as selected distribution types 630.

Figure 7:
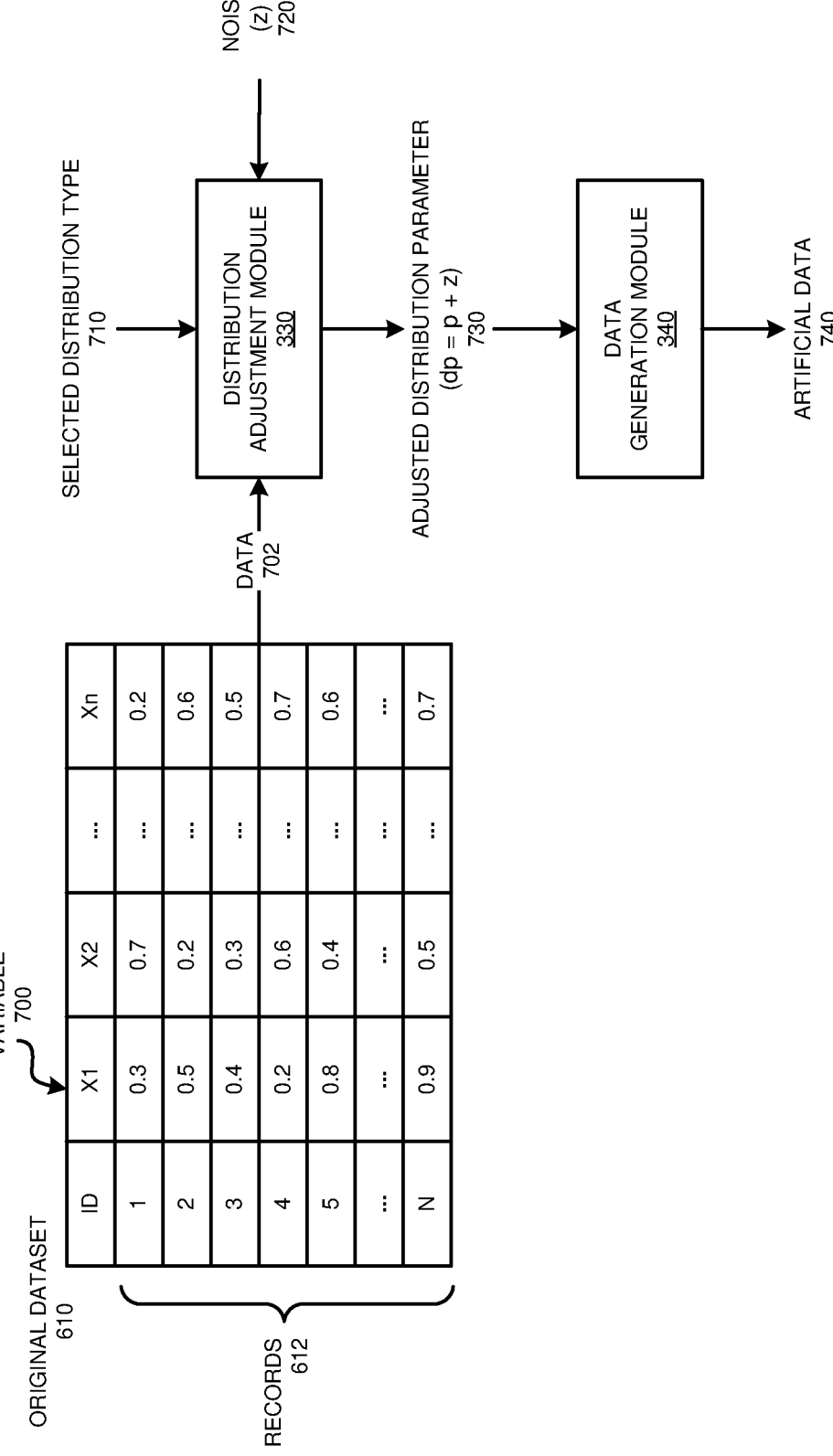
FIG. 7 depicts a continued example of artificial data generation for differential privacy in accordance with an illustrative embodiment.

With reference to FIG. 7, this figure depicts a continued example of artificial data generation for differential privacy in accordance with an illustrative embodiment. Distribution adjustment module 330 and data generation module 340 are the same as distribution adjustment module 330 and data generation module 340 in FIG. 3. Original dataset 610 and records 612 are the same as original dataset 610 and records 612 in FIG. 6.

Distribution adjustment module 330 fits selected distribution type 710 to data 702 of variable 700 in original dataset 610. The fitting configures values of one or more parameters of selected distribution type. 710. Using a desired level of privacy and selected distribution type 710 module 330 adjusts a level of noise 720 to be added to a configured parameter of selected distribution type 710. Module 330 adds noise data corresponding to level of noise 720 to a configured parameter of the selected distribution type, resulting in adjusted distribution parameter 730. Data generation module 340 uses selected distribution type 710, configured according to adjusted distribution parameter 730, to generate artificial data 740.

Figure 8:
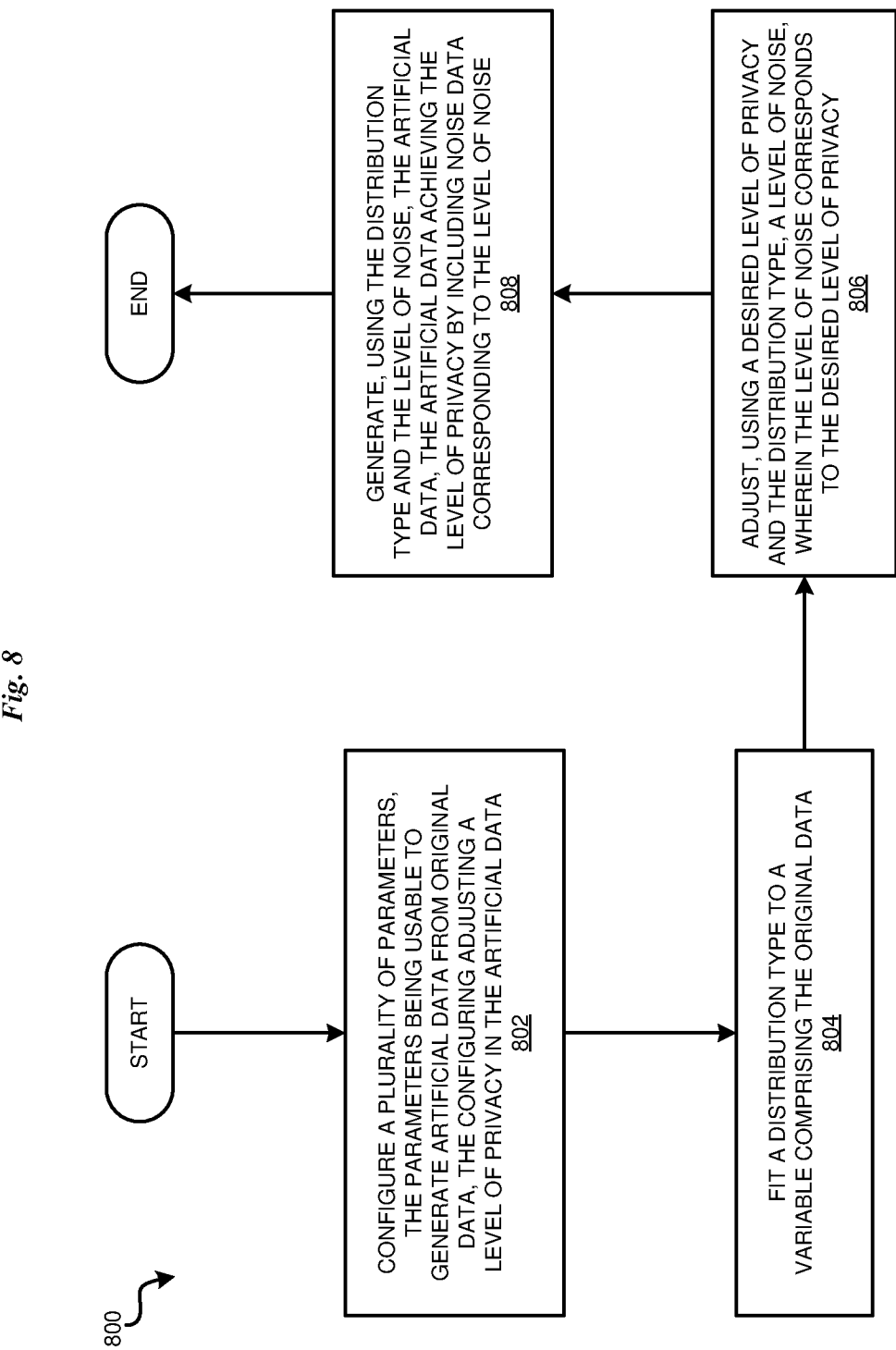
FIG. 8 depicts a flowchart of an example process for artificial data generation for differential privacy in accordance with an illustrative embodiment.

With reference to FIG. 8, this figure depicts a flowchart of an example process for artificial data generation for differential privacy in accordance with an illustrative embodiment. Process 800 can be implemented in application 200 in FIG. 3.

In the illustrated embodiment, at block 802, the process configures a plurality of parameters, the parameters being usable to generate artificial data from original data, the configuring adjusting a level of privacy in the artificial data. At block 804, the process fits a distribution type to a variable of the original data. At block 806, the process adjusts, using a desired level of privacy and the distribution type, a level of noise, wherein the level of noise corresponds to the desired level of privacy. At block 808, the process generates, using the distribution type and the level of noise, the artificial data, the artificial data achieving the level of privacy by including noise data corresponding to the level of noise. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
generating artificial data for differential privacy datasets and having a configurable degree of privacy protection, the generating comprising:
configuring a plurality of parameters, the parameters being usable to generate artificial data from original data, the configuring adjusting a level of privacy in the artificial data;
fitting a distribution type to a variable of the original data;
executing, as a part of an artificial data generation application, an adjustment code configured to perform adjusting, using a desired level of privacy and the distribution type, a level of noise, wherein the level of noise corresponds to the desired level of privacy, wherein executing the adjustment code sets the level of noise based on a local sensitivity, the local sensitivity being the largest difference between two analysis results of two corresponding datasets wherein the two corresponding datasets are the same except for one record;
generating from an execution of the artificial data generation application, using the distribution type and the level of noise, the artificial data, the artificial data achieving the desired level of privacy by including noise data corresponding to the level of noise; and regenerating, by changing at least one of the plurality of parameters, and responsive to determining that a similarity between an original value of the variable and a generated value of the variable is less than a threshold value, new artificial data.

2. The computer-implemented method of claim 1, wherein configuring the plurality of parameters comprises setting an upper bound parameter of a continuous variable comprising the original data to a first value according to a statistical characteristic of the continuous variable.

3. The computer-implemented method of claim 1, wherein configuring the plurality of parameters comprises setting a lower bound parameter of a continuous variable comprising the original data to a second value according to a statistical characteristic of the continuous variable.

4. The computer-implemented method of claim 1, wherein the variable contributes to a privacy aspect of the original data.

5. The computer-implemented method of claim 1, wherein fitting a distribution type to the variable of the original data further comprises:

selecting, from a plurality of distribution type fittings according to a goodness of fit statistic computed on each distribution type fitting, the distribution type.

6. The computer-implemented method of claim 1, wherein the desired level of privacy is higher than a level of privacy in the original data.

7. A computer program product comprising one or more computer readable storage media, and program instructions collectively stored on the one or more computer readable storage media, the program instructions executable by a processor to cause the processor to perform operations comprising:

generating artificial data for differential privacy datasets and having a configurable degree of privacy protection, the generating comprising:

configuring a plurality of parameters, the parameters being usable to generate artificial data from original data, the configuring adjusting a level of privacy in the artificial data;

fitting a distribution type to a variable of the original data;

executing, as a part of an artificial data generation application, an adjustment code configured to perform adjusting, using a desired level of privacy and the distribution type, a level of noise, wherein the level of noise corresponds to the desired level of privacy, wherein executing the adjustment code sets the level of noise based on a local sensitivity, the local sensitivity being the largest difference between two analysis results of two corresponding datasets wherein the two corresponding datasets are the same except for one record;

generating from an execution of the artificial data generation application, using the distribution type and the level of noise, the artificial data, the artificial data achieving the desired level of privacy by including noise data corresponding to the level of noise; and regenerating, by changing at least one of the plurality of parameters, and responsive to determining that a similarity between an original value of the variable and a generated value of the variable is less than a threshold value, new artificial data.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, wherein configuring the plurality of parameters comprises setting an upper bound parameter of a continuous variable comprising the original data to a first value according to a statistical characteristic of the continuous variable.

11. The computer program product of claim 7, wherein configuring the plurality of parameters comprises setting a lower bound parameter of a continuous variable comprising the original data to a second value according to a statistical characteristic of the continuous variable.

12. The computer program product of claim 7, wherein the variable contributes to a privacy aspect of the original data.

13. The computer program product of claim 7, wherein fitting a distribution type to the variable of the original data further comprises:

selecting, from a plurality of distribution type fittings according to a goodness of fit statistic computed on each distribution type fitting, the distribution type.

14. The computer program product of claim 7, wherein the desired level of privacy is higher than a level of privacy in the original data.

15. A computer system comprising a processor and one or more computer readable storage media, and program instructions collectively stored on the one or more computer readable storage media, the program instructions executable by the processor to cause the processor to perform operations comprising:

generating artificial data for differential privacy datasets and having a configurable degree of privacy protection, the generating comprising:

configuring a plurality of parameters, the parameters being usable to generate artificial data from original data, the configuring adjusting a level of privacy in the artificial data;

fitting a distribution type to a variable of the original data;

executing, as a part of an artificial data generation application, an adjustment code configured to perform adjusting, using a desired level of privacy and the distribution type, a level of noise, wherein the level of noise corresponds to the desired level of privacy, wherein executing the adjustment code sets the level of noise based on a local sensitivity, the local sensitivity being the largest difference between two analysis results of two corresponding datasets wherein the two corresponding datasets are the same except for one record;

generating from an execution of the artificial data generation application, using the distribution type and the level of noise, the artificial data, the artificial data achieving the desired level of privacy by including noise data corresponding to the level of noise; and regenerating, by changing at least one of the plurality of parameters, and responsive to determining that a similarity between an original value of the variable and a generated value of the variable is less than a threshold value, new artificial data.

16. The computer system of claim 15, wherein configuring the plurality of parameters comprises setting an upper bound parameter of a continuous variable comprising the original data to a first value according to a statistical characteristic of the continuous variable.

17. The computer system of claim 15, wherein configuring the plurality of parameters comprises setting a lower bound parameter of a continuous variable comprising the original data to a second value according to a statistical characteristic of the continuous variable.

18. The computer system of claim 15, wherein the variable contributes to a privacy aspect of the original data.

19. The computer system of claim 15, wherein fitting a distribution type to the variable of the original data further comprises:

selecting, from a plurality of distribution type fittings according to a goodness of fit statistic computed on each distribution type fitting, the distribution type.

20. The computer system of claim 15, wherein the desired level of privacy is higher than a level of privacy in the original data.

21. A data processing system comprising a processor and one or more computer readable storage media, and program instructions collectively stored on the one or more computer readable storage media, the program instructions executable by the processor to cause the processor to perform operations comprising:

generating artificial data for differential privacy datasets and having a configurable degree of privacy protection, the generating comprising:

configuring a plurality of parameters, the parameters being usable to generate artificial data from original data, the configuring adjusting a level of privacy in the artificial data;

fitting a distribution type to a variable of the original data;

executing, as a part of an artificial data generation application, an adjustment code configured to perform adjusting, using a desired level of privacy and the distribution type, a level of noise, wherein the level of noise corresponds to the desired level of privacy, wherein executing the adjustment code sets the level of noise based on a local sensitivity, the local sensitivity being the largest difference between two analysis results of two corresponding datasets wherein the two corresponding datasets are the same except for one record;

generating from an execution of the artificial data generation application, using the distribution type and the level of noise, the artificial data, the artificial data achieving the desired level of privacy by including noise data corresponding to the level of noise; and regenerating, by changing at least one of the plurality of parameters, and responsive to determining that a similarity between an original value of the variable and a generated value of the variable is less than a threshold value, new artificial data.

22. The data processing system of claim 21, wherein configuring the plurality of parameters comprises setting an upper bound parameter of a continuous variable comprising the original data to a first value according to a statistical characteristic of the continuous variable.

23. The data processing system of claim 21, wherein configuring the plurality of parameters comprises setting a lower bound parameter of a continuous variable comprising the original data to a second value according to a statistical characteristic of the continuous variable.

24. The data processing system of claim 21, wherein the variable contributes to a privacy aspect of the original data.

25. A virtualized computing environment in a cloud infrastructure comprising a virtualized processor resource and a cloud storage comprising one or more computer readable storage media, and program instructions collectively stored on the one or more computer readable storage media of the cloud storage, the program instructions executable by the virtualized processor resource to cause the virtualized processor resource to perform operations comprising:

generating artificial data for differential privacy datasets and having a configurable degree of privacy protection, the generating comprising:

configuring a plurality of parameters, the parameters being usable to generate artificial data from original data, the configuring adjusting a level of privacy in the artificial data;

fitting a distribution type to a variable of the original data;

executing, as a part of an artificial data generation application, an adjustment code configured to perform adjusting, using a desired level of privacy and the distribution type, a level of noise, wherein the level of noise corresponds to the desired level of privacy, wherein executing the adjustment code sets the level of noise based on a local sensitivity, the local sensitivity being the largest difference between two analysis results of two corresponding datasets wherein the two corresponding datasets are the same except for one record;

generating from an execution of the artificial data generation application, using the distribution type and the level of noise, the artificial data, the artificial data achieving the desired level of privacy by including noise data corresponding to the level of noise; and regenerating, by changing at least one of the plurality of parameters, and responsive to determining that a similarity between an original value of the variable and a generated value of the variable is less than a threshold value, new artificial data.

\* \* \* \* \*